June 27, 1939.      O. H. PILKEY      2,163,628
METHOD OF MOISTENING GRAIN
Filed July 22, 1937
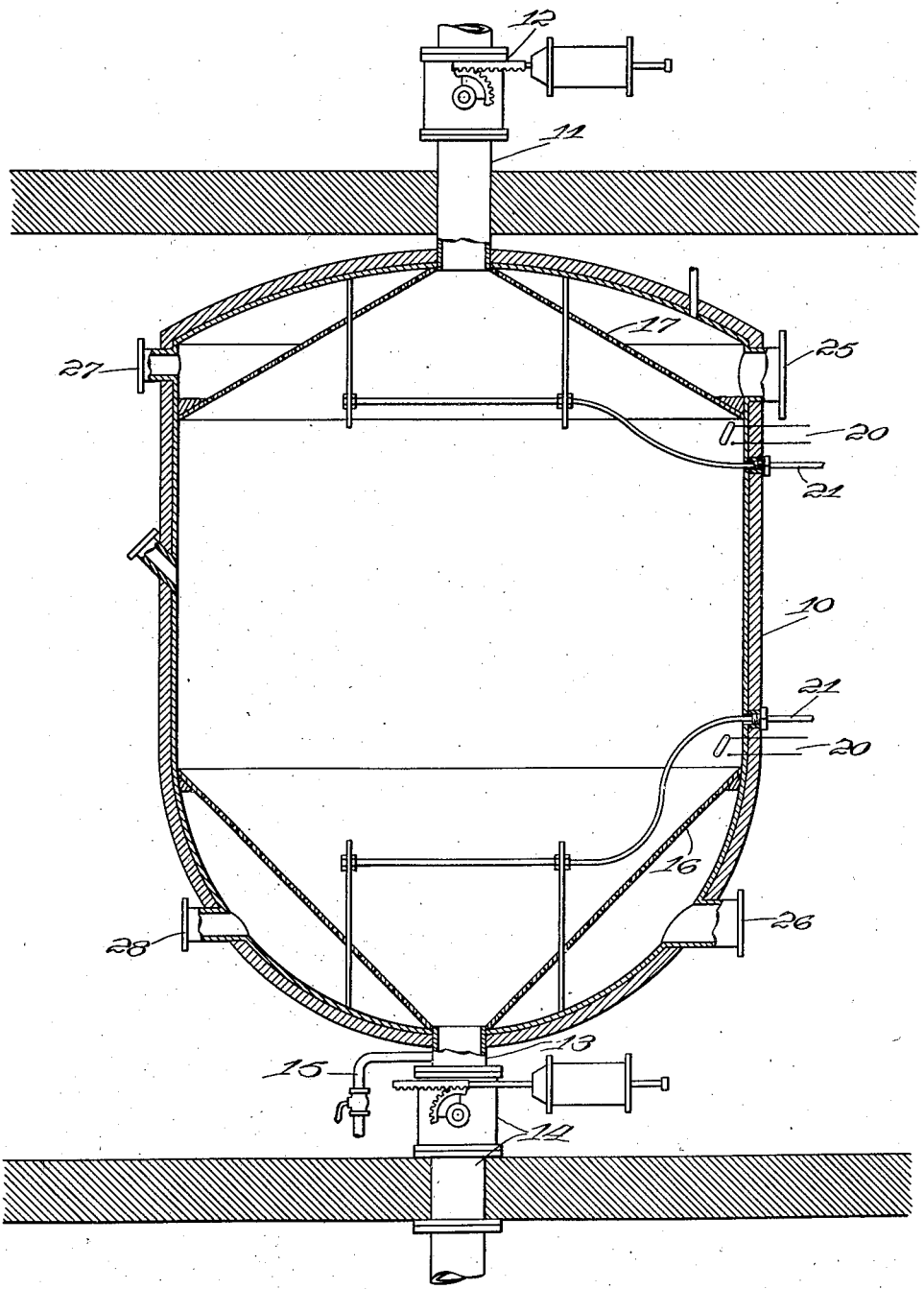

Patented June 27, 1939

2,163,628

UNITED STATES PATENT OFFICE 2,163,628

METHOD OF MOISTENING GRAIN

Orrin H. Pilkey, Chicago, Ill., assignor to The Guardite Corporation, a corporation of Illinois Application July 22, 1937, Serial No. 155,143

1 Claim. (Cl. 83—27)

This invention relates to a method of steam moistening products and more particularly to a method of moistening products where it is desired to bring the product to a predetermined temperature.

The invention is primarily applicable to the treatment of organic products such as grain, tobacco and the like in the manner set forth in Merriam and Wiles Patent 2,080,179 and in Baer application 126,706, filed February 19, 1937, and also in my co-pending application Ser. No. 153,037, filed July 10, 1937.

As set forth in the Merriam and Wiles patent, organic products are subjected at atmospheric temperatures to a vacuum sufficiently high to cause boiling of contained moisture, and the boiling is continued until substantially all non-condensible gas has been washed from the product. Steam may then be admitted to the product.

As described in said Baer application 126,706, wheat is treated in a large static mass in a single chamber wherein the wheat forms a seal between steam inlet and the vacuum pump, thus permitting a current of steam to be directed through the mass.

The apparatus is diagrammatically illustrated in the figure, in which:

10 represents an air tight container vertically disposed, 11 is an inlet thereto controlled by a pneumatically operated valve 12, 13 is an outlet therefrom controlled by pneumatically operated valve 14, 15 is a valve controlled drain, 16 is an annular foraminous baffle having a slope above the angle of repose of grain and arranged to feed grain to the outlet. A foraminous baffle 17 having an angle less than the angle of repose of the grain is positioned in the top of the container. Thermometers 20 and 21 are provided to measure the temperature of the grain. The outlet 25 leads to a vacuum pump (not shown) as does the opening 26 at the bottom of the tank. Steam is admitted to the tank through the line 27 at the top or line 28 at the bottom of the tank.

In the treatment of many organic products it is desired to handle the product at a predetermined maximum temperature. For example, as described in my co-pending application Ser. No. 153,037, in the moistening of wheat it is generally desirable not to mill the moistened product above 85-90 degrees F. It is therefore more economical in the process of moistening not to exceed a temperature of somewhat the same order. It has now been discovered that improved results may be obtained by moistening the product with a current of steam so passed through the product as to heat one part of it above the predetermined temperature and another part below it, the average temperature, however, being of the desired degree.

For example, wheat was placed in a closed container, for example such as that described in Baer application 126,706 and then subjected to a vacuum sufficient to cause boiling of contained moisture under atmospheric temperature until its temperature had fallen several degrees. Steam was then introduced in a stream through the grain until that portion thereof nearest the entrance of the steam had a temperature of 110 degrees F. and further steam removed therefrom had a temperature of only approximately 90 degrees F. The average temperature in the grain, however, was the desired predetermined temperature of 100 degrees F.

Steaming was then stopped and evacuation recommenced, whereupon the whole body of the grain first reached a temperature of approximately 100 degrees F. and then commenced to fall.

Evacuation was then continued until the entire product had a temperature of approximately 85 degrees and the vacuum held at that point for about 18 minutes. The vacuum was then broken and the grain dumped and sent promptly to the milling process.

As a specific example of the process, wheat having an initial temperature of approximately 68° F. and a moisture content of approximately 10.2% was treated with about 6% of water to form a surface film and then introduced into a vacuum tank. The tank was evacuated until the temperature of the wheat had dropped about 4° F., after which steam was introduced for a period of approximately 5 minutes to produce a temperature at the top of the tank of about 110° F. and a temperature at the bottom of the tank of 94° F. When the steaming was stopped and evacuation commenced the temperature in the tank promptly reached approximately the average of 110° F. and 94° F. and then started to fall. The tank was then evacuated for 5 minutes to produce a temperature of about 89° F. in the wheat and the wheat held at this temperature for 16 minutes.

The treated grain dropped to 85° F. or below during handling and had a final water content of approximately 15.3%. Flour produced from this grain had a moisture content of approximately 13.2%.

In a similar operation the same wheat having a temperature of about 67° F. was moistened with the same percentage of water placed in the tank, a vacuum drawn until the temperature had dropped to 62½° F., after which steam was introduced at 220° F. and the corresponding pressure to produce a top temperature of about 90° F. and a bottom temperature of approximately 112° F. in the wheat, after which evacuation was commenced and continued for 9 minutes. After 2 minutes' evacuation the top and bottom temperatures in the bin were approximately 98° F. and 99° F. respectively. At the end of the evacuation they were 88° F. and 90° F. respectively. The grain was then held at this temperature for 16½ minutes, at the end of which time the temperatures were 87° and 88° F. respectively.

The treated material milled excellently into flour and the grain and flour had substantially the same moisture content as the preceding batch, any differences being within the limits of experimental error.

What I claim as new and desire to secure by Letters Patent is:

The method of moistening grain containing moisture in an amount less than desired in a large static mass comprising subjecting the grain in a single container to a substantial vacuum such that moisture contained therein is boiled and washes out substantially all residual non-condensible gas, introducing steam in a stream through the evacuated product to raise the temperature of the grain to a predetermined average temperature, whereby the moisture content of the grain is substantially increased, the steam being introduced to produce a substantially higher temperature in one portion of the grain than in another, and then equalizing the temperature of the grain in the chamber by evacuation by application of vacuum to produce boiling of moisture from hotter portions of the grain.

ORRIN H. PILKEY.